United States Patent
Wang et al.

(10) Patent No.: US 8,824,326 B2
(45) Date of Patent: Sep. 2, 2014

(54) METHOD AND APPARATUS FOR MANAGING DEVICE-TO-DEVICE INTERFERENCE

(75) Inventors: Haiming Wang, Beijing (CN); Shaoyi Xu, Beijing (CN); Tao Peng, Beijing (CN); Qianxi Lu, Beijing (CN)

(73) Assignee: Nokia Corporation, Espoo (FI)

( * ) Notice: Subject to any disclaimer, the term of this patent is extended or adjusted under 35 U.S.C. 154(b) by 293 days.

(21) Appl. No.: 13/318,347

(22) PCT Filed: Apr. 30, 2009

(86) PCT No.: PCT/IB2009/051772
§ 371 (c)(1),
(2), (4) Date: Oct. 31, 2011

(87) PCT Pub. No.: WO2010/125427
PCT Pub. Date: Nov. 4, 2010

(65) Prior Publication Data
US 2012/0051315 A1    Mar. 1, 2012

(51) Int. Cl.
*H04L 12/26* (2006.01)

(52) U.S. Cl.
USPC .................. 370/252; 370/328; 455/452.1

(58) Field of Classification Search
None
See application file for complete search history.

(56) References Cited

U.S. PATENT DOCUMENTS

| | | | |
|---|---|---|---|
| 7,106,707 B1 * | 9/2006 | Strutt | 370/329 |
| 8,095,139 B2 * | 1/2012 | Marinier | 455/446 |
| 8,107,883 B2 | 1/2012 | Peng et al. | |
| 2007/0104138 A1 | 5/2007 | Rudolf et al. | |
| 2008/0130565 A1 | 6/2008 | Jeong et al. | |
| 2010/0093364 A1 * | 4/2010 | Ribeiro et al. | 455/452.2 |
| 2011/0230200 A1 * | 9/2011 | Dimou et al. | 455/452.2 |
| 2011/0275399 A1 * | 11/2011 | Englund et al. | 455/513 |

FOREIGN PATENT DOCUMENTS

CN    1404700 A    3/2003

OTHER PUBLICATIONS

Office Action received for corresponding Chinese Application No. 200980158658.2, dated Sep. 23-27, 2013, 14 pages.
"3rd Generation Partnership Project; Technical Specification Group Radio Access Network; Evolved Universal Terrestrial Radio Access (E-UTRA); Physical layer—Measurements(Release 8)", 3GPP TS 36.214, v8.5.0, Dec. 2008, pp. 1-11.
Ericsson, "Inter-Cell Interference Handling for E-UTRA", TSG-RAN WG1 #42, R1-050764, Agenda Item: 10.2, London, UK, Aug. 29-Sep. 2, 2005, 4 pages.
Huawei, "Soft Frequency Reuse Scheme for UTRAN LTE", 3GPP TSG RAN WG1 Meeting #41, R1-050507, Agenda Item: 13.2, Athens, Greece, May 9-13, 2005, 6 pages.
International Search Report and Written Opinion received for corresponding Patent Cooperation Treaty Application No. PCT/IB2009/051772, dated Feb. 16, 2010, 10 pages.
Office Action received for corresponding European Patent Application No. 09786377.3, dated Aug. 3, 2012, 5 pages.
Office Action received for corresponding European Patent Application No. 09786377.3, dated Feb. 26, 2013, 5 pages.

* cited by examiner

*Primary Examiner* — Brian Roberts
(74) *Attorney, Agent, or Firm* — Mintz, Levin, Cohn, Ferris, Glovsky and Popeo, P.C.

(57) ABSTRACT

Various methods for managing device-to-device interference are provided. One example method includes receiving an expected interference level for a resource block, where the expected interference level is represented by data indicative of interference associated with the resource block due to device-to-device communications using the resource block. The example method further includes selecting the resource block for a device-to-device communications session based at least in part on the expected interference level for the resource block. Similar and related example methods and example apparatuses are also provided.

20 Claims, 8 Drawing Sheets

FIG. 2a

| ExpInterfereTable | |
|---|---|
| RB1 | ExpInterfere1 |
| RB2 | ExpInterfere2 |
| RB3 | ExpInterfere3 |
| RB4 | ExpInterfere4 |
| RB5 | ExpInterfere5 |
| RB6 | ExpInterfere6 |

FIG. 2b

| ExpInterfereTable | | |
|---|---|---|
| CeUE1 | RB1 | ExpInterfere1 |
| | RB2 | ExpInterfere2 |
| | RB3 | ExpInterfere3 |
| CeUE2 | RB4 | ExpInterfere4 |
| | RB5 | ExpInterfere5 |
| CeUE3 | RB6 | ExpInterfere6 |

FIG. 2c

| ExpInterfereTable | |
|---|---|
| RB1 | ExpInterfere_1 |
| RB2 | |
| RB3 | ExpInterfere_2 |
| RB4 | |
| RB5 | |
| RB6 | ExpInterfere_3 |

FIG. 2d

| ExpInterfereTable | |
|---|---|
| Sub-band1 | ExpInterfere1 |
| Sub-band2 | ExpInterfere2 |
| Sub-band3 | ExpInterfere3 |

METHOD AND APPARATUS FOR MANAGING DEVICE-TO-DEVICE INTERFERENCE

RELATED APPLICATION

This application was originally filed as PCT Application No. PCT/IB2009/051772, filed Apr. 30, 2009.

TECHNICAL FIELD

Embodiments of the present invention relate generally to mechanisms that support wireless communications, and, more particularly, relate to a method and apparatus for managing device-to-device interference.

BACKGROUND

In many cellular communications systems, communications from one user equipment (UE) is routed through a node (e.g., a base station, access point, or the like) to another UE. The operation of the node not only provides a routing mechanism for the cellular network, the node may also perform resource management within an associated cell, since the node is privy to all communications within the cell. However, due to the potential for increased data transfer rates and increased system bandwidth, system designers are now considering the implementation of ad-hoc networks, or Device-to-Device (D2D) networks without a central routing device, together with cellular communications systems to generate hybrid systems. The ad-hoc portions of the hybrid system may conduct communications directly between UEs, with routing the communications through the node. However, due to the need to share resources between the ad-hoc portions and the cellular portions of the hybrid network, interference can occur.

BRIEF SUMMARY

Methods and apparatus are described that provide for management of device-to-device interference within hybrid networks. According to an example embodiment of the present invention, a collection of expected interference levels associated with respective resource blocks (e.g., an expected interference level table) may be determined by a node. An expected interference level may be determined based upon measured time-variant interference associated with a respective resource block, as well as UE characteristics and/or quality of service requirements for the resource block. The node may transmit (e.g., broadcast) the expected interference levels to the UEs to facilitate informed decision making by UEs with regard to resource block selection for D2D communications. The node may also transmit updated expected interference levels for use by the UEs.

In accordance with various example embodiments, a UE implements informed Radio Resource Management (RRM) for radio resource allocation, transmission power determination, Mobile Switching Center (MSC) selection, or the like to limit interference when using D2D communications. According to some example embodiments, the UE manages the interference in an autonomous fashion with limited signaling overhead from the node. In accordance with various example embodiments, a node may optimize a hybrid communications system by flexibly controlling the D2D interference via the expected interference values to either improve performance of the cellular portion of the system (e.g., limit D2D communications) or improve performance of the ad-hoc/D2D portion of the system (e.g., allow for increased D2D communications).

Various example embodiments of the present invention are described herein. One example embodiment is a method for managing D2D interference. The example method includes receiving an expected interference level for a resource block where the expected interference level is represented by data indicative of interference associated with the resource block due to device-to-device communications using the resource block. The example method may also include selecting the resource block for a device-to-device communications session based at least in part on the expected interference level for the resource block. According to various other example methods, a plurality of expected interface levels for respective resource blocks may be received, and selection may be performed with respect the plurality of expected interface levels for respective resource blocks.

Another example embodiment is an example apparatus for managing D2D interference. The example apparatus comprises a processor and a memory storing instructions that, in response to execution of the instructions by the processor, cause the example apparatus to perform various functions. The example apparatus is caused to receive an expected interference level for a resource block, where the expected interference level is represented by data indicative of interference associated with the resource block due to device-to-device communications using the resource block. The example apparatus may also be caused to select the resource block for a device-to-device communications session based at least in part on the expected interference level for the resource block.

Another example embodiment is an example computer program product for managing D2D interference. The example computer program product comprises at least one computer-readable storage medium having executable computer-readable program code instructions stored therein. The computer-readable program code instructions of the example computer program product are configured to receive an expected interference level for a resource block where the expected interference level is represented by data indicative of interference associated with the resource block due to device-to-device communications using the resource block. The computer-readable program code instructions of the example computer program product are further configured to select the resource block for a device-to-device communications session based at least in part on the expected interference level for the resource block.

According to another example embodiment, an example apparatus for managing D2D interference is provided. The example apparatus includes means for receiving an expected interference level for a resource block where the expected interference level is represented by data indicative of interference associated with the resource block due to device-to-device communications using the resource block. The example apparatus may also include means for selecting the resource block for a device-to-device communications session based at least in part on the expected interference level for the resource block.

Another example method for managing D2D interference may include receiving an interference measurement associated with a resource block and determining an expected interference level for the resource block based at least in part on the interference measurement. The example method may further include providing for transmission of data indicative of the expected interference level in association with the resource block to one or more communications devices to facilitate a selection of the resource block for device-to-device communications based at least in part on the expected interference level. In some example methods, receiving an interference measurement associated with a resource block may include receiving a plurality of interference measurements associated with respective resource blocks and determining expected interference levels for the resource blocks based at least in part on the respective interference measurements.

Another example embodiment is an example apparatus for managing D2D interference. The example apparatus comprises a processor configured to perform various functions or cause the example apparatus to perform various functions. The processor of the example apparatus is configured to receive an interference measurement associated with a resource block and determine an expected interference level for the resource block based at least in part on the interference measurement. The processor of the example apparatus may also be configured to provide for transmission of data indicative of the expected interference level in association with the resource block to one or more communications devices to facilitate a selection of the resource block for device-to-device communications based at least in part on the expected interference level.

Another example embodiment is an example computer program product for managing D2D interference. The example computer program product comprises at least one computer-readable storage medium having executable computer-readable program code instructions stored therein. The computer-readable program code instructions of the example computer program product are configured to receive an interference measurement associated with a resource block and determine an expected interference level for the resource block based at least in part on the interference measurement. The computer-readable program code instructions may also be configured to provide for transmission of data indicative of the expected interference level in association with the resource block to one or more communications devices to facilitate a selection of the resource block for device-to-device communications based at least in part on the expected interference level.

BRIEF DESCRIPTION OF THE DRAWING(S)

Having thus described the invention in general terms, reference will now be made to the accompanying drawings, which are not necessarily drawn to scale, and wherein:

FIG. 2a illustrates an example table for expected interference levels according to various example embodiments of the present invention;

FIG. 2b illustrates another example table for expected interference levels according to various example embodiments of the present invention;

FIG. 2c illustrates another example table for expected interference levels according to various example embodiments of the present invention;

FIG. 2d illustrates another example table for expected interference levels according to various example embodiments of the present invention;

Figure 8A:
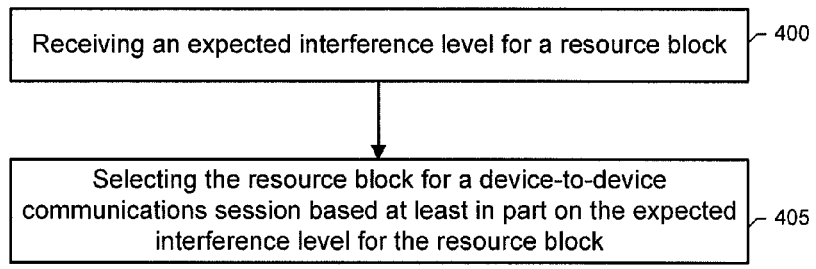
Figure 8B:
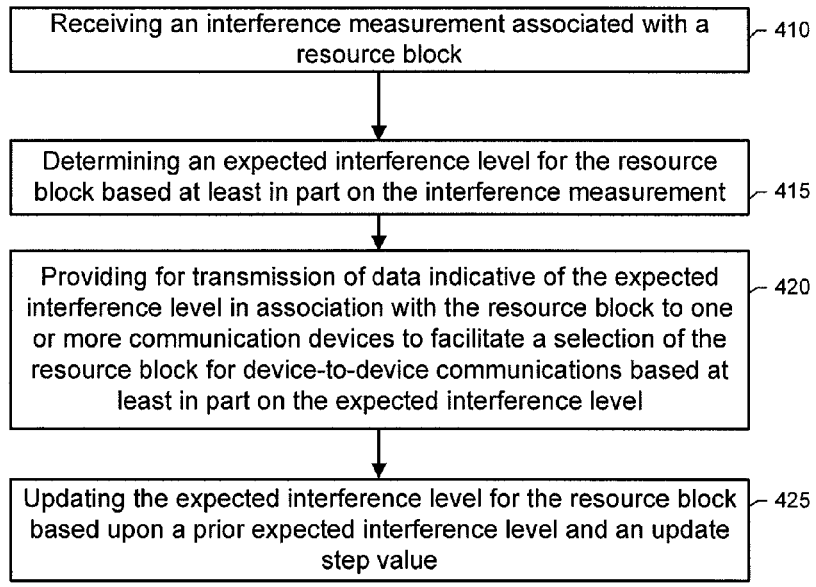

FIG. 8a illustrates an example method for managing D2D interference from the perspective of a resource block selection apparatus according to various example embodiments of the present invention; and FIG. 8b illustrates an example method for managing D2D interference from the perspective of an expected interference level generation apparatus according to various example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

Figure 1:
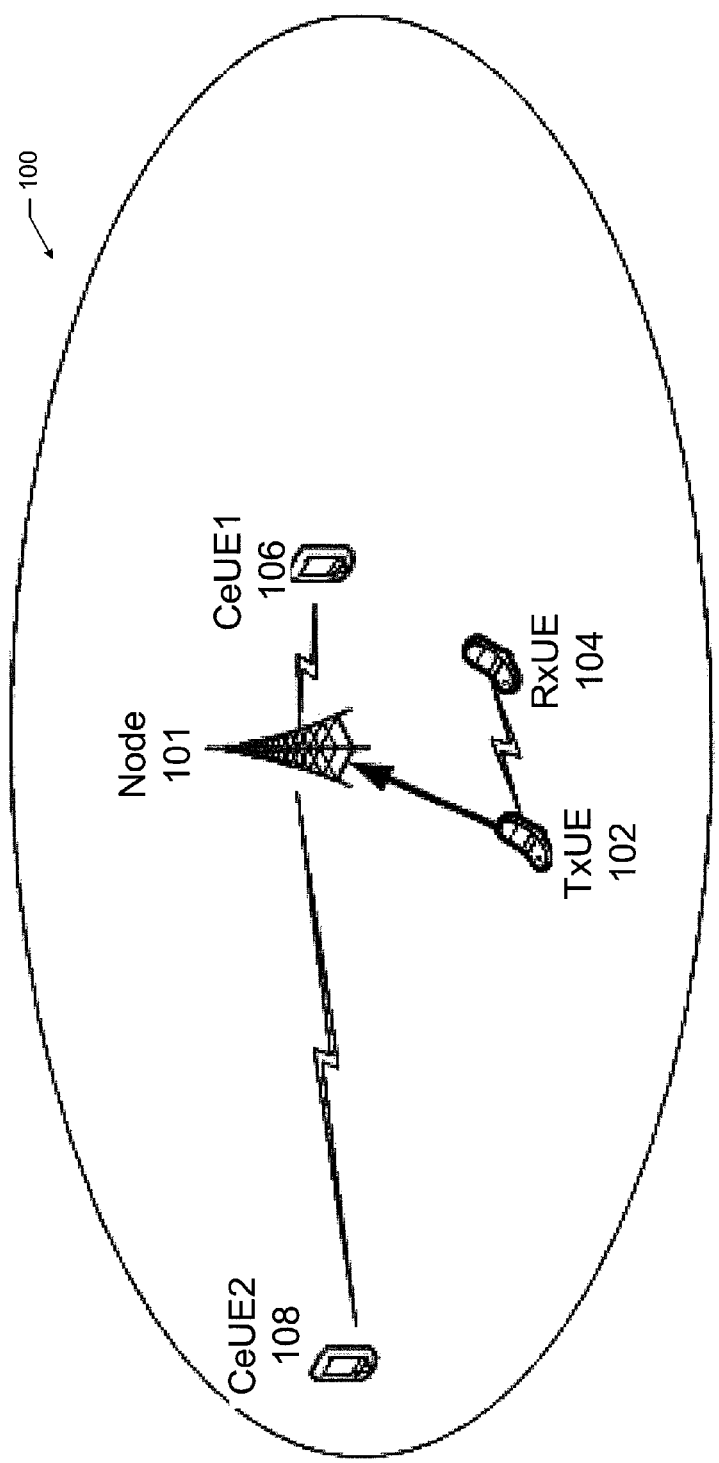
FIG. 1 illustrates a hybrid D2D and cellular communications system according to various example embodiments of the present invention.

FIG. 1 depicts a portion (e.g., a cell) of an example hybrid cellular/D2D network 100 in accordance with various embodiments of the present invention. The network 100 includes a node 101, and a plurality of UEs (e.g., TxUE 102, RxUE 104, CeUE1 106, and CeUE2 108). The node 101 may be configured as any type of access point or base station that supports cellular communications. For example, the node 101 may be configured as an eNodeB (eNB) within a Long-Term Evolution (LTE) communications system. The cellular communications may utilize Frequency Division Duplexing (FDD) or Time Division Duplexing (TDD). Node 101 may also be configured to facilitate or otherwise allow the implementation of an ad-hoc networking between UEs within range of the node 101 via D2D communications sessions.

The UEs may be any type of wireless communications devices configured to implement cellular communications, such as LTE, via the node 101. For example, CeUE1 106 and CeUE2 108 are depicted as currently being in cellular communication with each other via the node 101. The UEs may also be configured to support D2D communications. D2D communications may involve direct communications between two UEs or relay communications via UEs, and the D2D communications may be implemented using TDD. In this regard, TxUE 102 and RxUE 104 are depicted in FIG. 1 as being in communication via a D2D communications session. TxUE 102 is currently the transmitting UE in the D2D communication session and RxUE 104 is currently the receiving UE in the D2D communications session.

The portion of the hybrid network 101 that operates in the cellular communication mode utilizes the node 101, and possibly other nodes, as a centralized controller. As the centralized controller, the node 101 may be involved in all communications within the node's cell. As such, node 101 may provide for resource control and interference control for cellular communications within the cell.

When UEs are near each other, or a D2D connection is otherwise possible, increasingly efficient communications may be achieved by using the D2D connection. For example, communications via the cellular communication mode may require twice the resource utilization due to the communications between the UEs and the node. Additionally, D2D communications may also achieve higher data rates between the UEs, while reducing the communications load on the node. Accordingly, hybrid networks, of the type depicted in FIG. 1 may provide improved system performance.

Since UEs in the hybrid network 100 may operate in either D2D mode or in cellular communication mode, frequency resources may be shared between the modes. Due to this sharing of resources, interference on shared resources may occur within the system when simultaneous communications are conducted in the cellular mode and the D2D mode. The use of omni-directional antennas by the UEs may further increase the likelihood of interference.

Referring to FIG. 1, the signal transmitted by TxUE 102 may interfere with the uplink (UL) data transmission of CeUE1 106 and CeUE2 108. Since CeUE2 108 is near the edge of the cell, CeUE2 108 may be increasingly susceptible to interference generated by TxUE 102. If TxUE 102 reuses CeUE2's UL frequency resources for the D2D data transmission to RxUE 104, the UL transmission of CeUE2 108 may suffer from the associated interference, and the performance of CeUE2 108's communications may be degraded. However, in some instances, reuse of resources may not be as problematic. For example, since CeUE1 106 is close to node 101, CeUE1 106 may not be as susceptible to interference generated by TxUE 102. In this regard, if TxUE 102 reused the resources allocated to CeUE1 106, rather than the resources allocated to CeUE2 108, and possibly also controlled the transmission power, the negative effects of TxUE 102's transmissions on the system may be relatively less.

Example embodiments of the present invention provide mechanisms for facilitating a UE's selection of resources for utilization in D2D communications to lessen or avoid interference with cellular communications. According to various example embodiments, a node (e.g., node 101) may assist UEs in the selection of resources. In this regard, based on various inputs, such as the UL Radio Resource Management (RRM) decisions, operator pre-set parameters, UL received interference power, propagation loss between cellular UEs and the node, cellular UEs maximum transmission power, and the like, a node may determine and update and expected interference level, also referred to as an ExpInterfere value, for each UL Resource Block (RB). The ExpInterfere values for the respective RBs may be compiled as a collection of data, such as in the form of a table, which may be referred to as ExpInterfereTable, and broadcasted by a node to the UEs within the associated cell. The UEs may receive the ExpInterfereTable and use the ExpInterfere values to make D2D RRM decisions, such as decisions regarding resource allocation, transmission power, and the like so as to lessen or avoid harmful interference with the cellular UL. The node may also be aware of the interference tolerance or quality of service attributes associated with the RBs, and as such, the node may generate the ExpInterfere values based on the interference tolerance and/or quality of service attributes. The node may also be aware of the cumulative effects caused by multiple simultaneous D2D transmissions, and the ExpInterfere values may be generated with regard to the multiple simultaneous D2D transmissions as well.

In this regard, a node, such as the node 101, may calculate and update the ExpInterfere values for each RB for each Transmit Time Interval (TTI). Updating of the ExpInterfere values may be needed due to dynamic resource allocation in cellular UL and resultant time-variant fluctuations in the interference. Quality requirements may also be considered for each TTI.

ExpInterfere values may be quantified with a defined number of bits denoting the accuracy of the values. Quantification with larger numbers of bits may allow for elaborate interference control with a heavier signaling overhead. On the other hand, a one-bit ExpInterfere value may provide information indicating whether an RB is allowed or forbidden to be reused for D2D data transmission. For example, an allowed value may be a binary "1," while a forbidden value may be a binary "0." According to various example embodiments, a trade-off may be implemented in the design of the ExpInterfere values between accuracy and overhead by adjusting by the number of bits.

FIGS. 2a through 2d illustrate tables having example table designs for the content of an ExpInterfereTable in accordance with various example embodiments of the present invention. FIG. 2a provides a simplified table design where a separate ExpInterfere value is associated with each RB. FIG. 2b illustrates a table design that, in addition to the information provided in the table design depicted in FIG. 2a, includes the identification of the UE (first column) currently allocated the RB for cellular use. In this regard, the identity of the cellular UEs (UEs currently operating in a cellular mode) may be broadcasted together with the ExpInterfere values. The table design depicted in FIG. 2b may also allow D2D UEs (UEs operating a D2D mode) to make use of the included resource allocation information to avoid the interference from cellular UEs to D2D data transmissions.

FIG. 2c depicts another table design that may reduce the signaling overhead relative to the table design of FIG. 2b. The table design of FIG. 2c is implemented in accordance with an example embodiment of the invention where ExpInterfere values for RBs allocated to the same UE are generated such that a single composite ExpInterfere value is calculated for all RBs allocated to the UE. The composite ExpInterfere value for one UE may be a function of the RBs allocated to the UE. In this regard, the composite ExpInterfere value may be the linear average value of determined ExpInterfere values for each RB, or the composite ExpItenfere value may be the minimum value of the ExpInterfere values for the RBs allocated to the UE. The composite ExpInterfere value may then be associated with one or more RBs allocated to the UE as depicted in FIG. 2c. For comparison, the example RB allocation scenario of FIG. 2b is also utilized to generate the table depicted in FIG. 2c.

FIG. 2d depicts yet another example table design in accordance with some example embodiments of the present invention. The table design of FIG. 2d groups ExpInterfere values by sub-band, which may include a number of UEs. In this regard, the bandwidth utilized for communications may be divided into a number of sub-bands, and ExpInterfere values may be generated and assigned to RBs allocated to UEs operating the sub-band. Sub-band division may be static or at least semi-static, and the node may broadcast RB resources of each sub-band. Generating ExpInterfere values in accordance with sub-bands may be particularly useful in systems that adopt Soft Frequency Reuse (SFR) schemes.

Figure 3B:
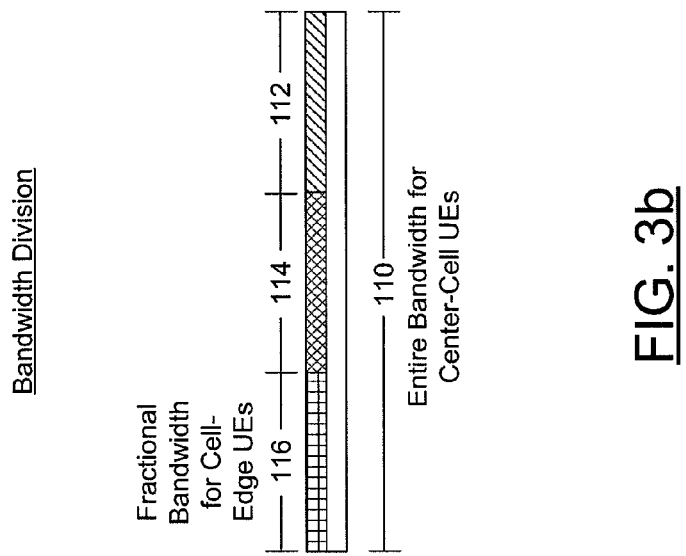
FIG. 3b illustrates an example bandwidth division for soft frequency reuse according to various example embodiments of the present invention.
Figure 3A:
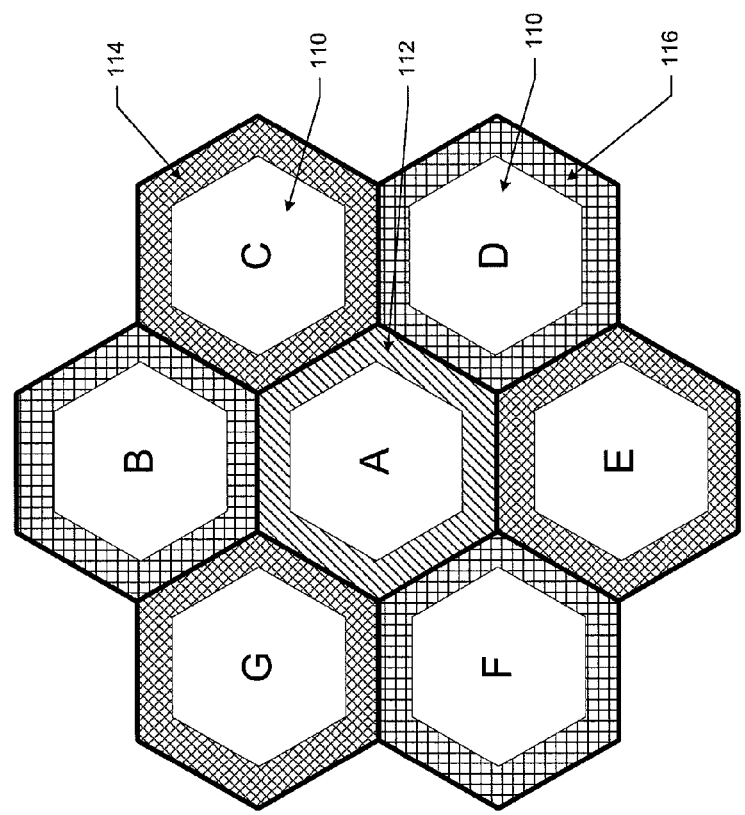
FIG. 3a illustrates an example configuration of cells for soft frequency reuse according to various example embodiments of the present invention.

FIGS. 3a and 3b depict example sub-band definitions for an example implementation of SFR. FIG. 3a depicts a geographic area covered by a multi-cell network including seven cell areas, A, B, C, D, E, F, and G. In multi-cell networks, inter-cell interference may occur when neighboring cells are assigned with the same frequency bandwidth, especially at or near the edge of a given cell. SFR schemes may avoid this cell boundary interference by utilizing disparate frequency sub-bands near the edges of the cells. To implement disparate frequency sub-bands, the available frequency spectrum may be divided into a plurality of sub-bands. FIG. 3b depicts an example implementation of SFR where three sub-bands are defined, namely sub-band 112, sub-band 114, and sub-band 116. Note that while FIGS. 3a and 3b depict an example scenario with three sub-bands, any number of sub-bands may be utilized for SFR schemes. The sub-bands may be allocated for communications by UEs that are located near the cell edges (cell-edge UEs). The sub-band areas may be defined such that adjacent cells use different sub-bands so as to avoid overlapping frequencies. For example, referring to FIG. 3a, note that cell A uses sub-band 112, and no adjacent cells also use sub-band 112. For UEs near the center of a cell (center-cell UEs), the entire bandwidth 110 is available for communications.

In the SFR scenario depicted in FIGS. 3a and 3b, the inter-cell interference received on different sub-bands may be different. As a part of the received interference of cellular UL, the range and/or fluctuation of inter-cell interference may affect the setting of the ExpInterfere value for the sub-band. For example, in cell A of FIG. 3a, the inter-cell interference may be attributed largely to interference on sub-band 116 and sub-band 114. The UEs on sub-band 112 may receive interference caused by cell-center UEs in the neighboring cell. However, within each sub-band, the interference environment may be similar and stable for long periods of time. Considering the nature of the interference present in SFR schemes, such as the scheme implemented with respect to FIGS. 3a and 3b, the ExpInterfere Table may be designed based on sub-bands as depicted in FIG. 2d.

Regardless of the design of the table, the ExpInterfere values may be received by the UEs intending to open a D2D communications session. In this regard, a UE may be configured to receive and possibly store the ExpInterfere Table for analysis in preparation for a D2D communications session. The D2D UEs intending to share and/or reuse the cellular UL resources, may also be configured to consider the ExpInterfere values to make smart D2D RRM decisions, such as resource allocation, power decision, and the like. Since each D2D UE may be aware of the path loss to the node, the ExpInterfere value for an RB may also be used to determine the allowed transmission power in the RB. In some example embodiments, a D2D UE may be configured to select an RB with an ExpInterfere value that indicates that the RB may support a higher transmission power for D2D communications to facilitate achieving a higher data rate. For example, referring again to FIG. 1, CeUE1 106's UL transmission may be able to tolerate much higher interference caused by D2D data transmission than CeUE2 108's UL transmission, due at least in part to CeUE1 106's close proximity to node 101. Thus, TxUE 102 may select the RB allocated to CeUE1 for D2D communications, and avoid reusing the RBs allocated for CeUE2 108's UL transmission, and also use a higher transmission power to possibly achieve a higher data rate.

Generation of the ExpInterfere values for input into the ExpInterfere Table may be performed in a variety of ways. Regardless of the manner in which the ExpInterfere values are generated or calculated, according to various example embodiments, the ExpInterfere values may be set for UL RBs to control the interference from D2D UEs to cellular UL transmissions. ExpInterfere values may be generated based at least in part on a measured amount of interference currently associated with the resources of an RB. For RBs that bear different cellular UL traffic with different quality requirements and different importance classes, the ExpInterfere values may be calculated and updated according to these parameters. In this regard, according to various example embodiments, the update procedure for free RBs may be different than the update procedure for allocated RBs. However, in accordance with various example embodiments, aspects described below with respect to the generation of ExpInterfere values for free RBs may be applied to allocated RBs and vice versa.

Free RBs may be RBs that are not allocated for cellular UEs UL transmission in a particular TTI or time duration. While free RBs may be used by D2D UEs for D2D data transmission, interference issues may arise with respect to free RBs, and management of the interference may be considered in a hybrid network. A node may set ExpInterfere values to a predefined default value PreExpInterfere for free RBs. To stabilize the interference in the network, ExpInterfere values may be subsequently updated with the interference variation introduced to the RBs.

Figure 4:
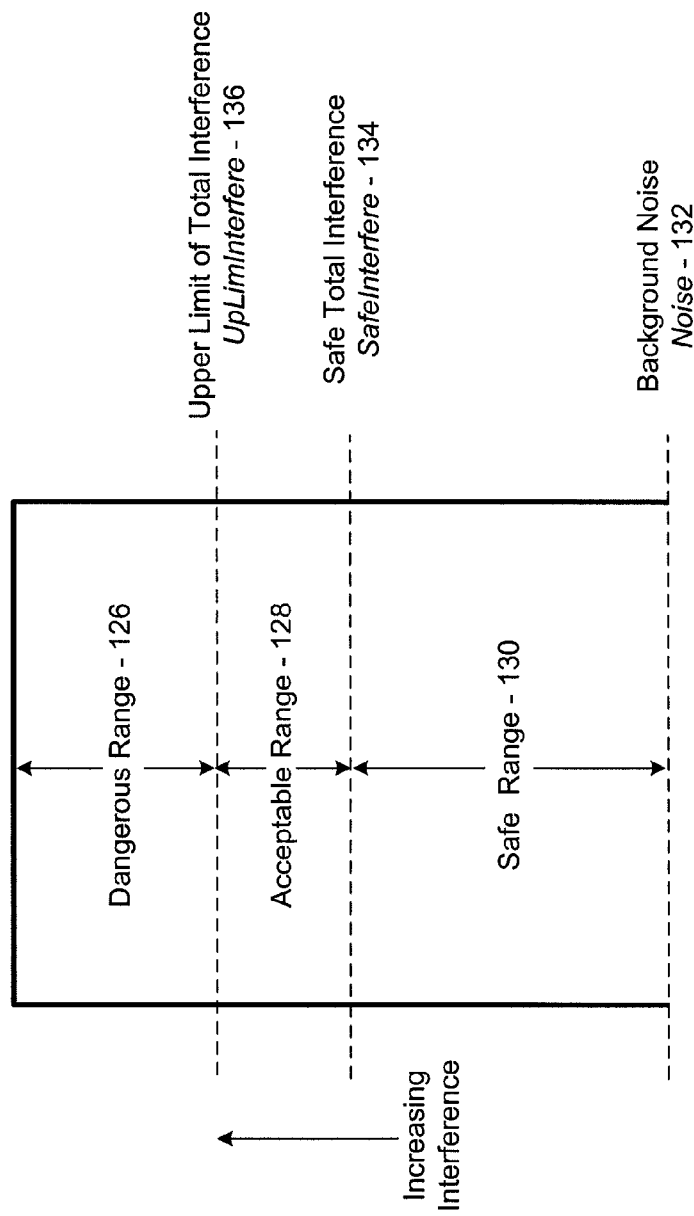
FIG. 4 illustrates example ranges for expected interference level calculation according to various example embodiments of the present invention.

FIG. 4 depicts example predefined ranges for the ExpInterfere values for free RBs. An upper limit of total interference UpLimInterfere 136 and a safe total interference SafeInterfere 134 may be defined to generate transition points between a safe range 130, an acceptable range 128, and a dangerous range 126 for interference. The UpLimInterfere value 136 and SafeInterfere value 134 may be defined by network operators to maintain network stability. A value for background noise Noise 132 associated with the RB may also be measured or otherwise obtained. After defining the ranges, measurements of the current interference associated with an RB may be taken, for example, by a node. The measurement may indicate that the current interference associated with an RB may be in the safe range 130, the acceptable range 128, or the dangerous range 126. Based on the range in which the current interference of the RB is located, the calculation of the associated ExpInterfere value may be altered.

One calculation example of the initial ExpInterfere value, or PreExpInterfere value, for free RBs, may be via the following equation:

$$\text{ExpInterfere} = \text{PreExpInterfere} = 10*\log(\exp10(\text{SafeInterfere}/10) - \exp10(\text{Noise}/10)). \quad (1)$$

After defining the initial ExpInterfere value, the ExpInterfere value may be updated when new interference measurements are available for the node, or changes to the interference are otherwise ascertained or expected to occur. When updating the ExpInterfere value based on the defined ranges, different ExpInterfere update steps Δ may be set. The following equation may be used for updating ExpInterfere values in this regard:

$$\text{ExpInterfere}(i) = \text{ExpInterfere}(i-1) + \Delta. \quad (2)$$

ExpInterfere(i) may be the updated value, ExpInterfere(i−1) may be the previous ExpInterfere value, and Δ may be the update step depending on the interference range that the measured interference at the node falls within. In this regard, if the measured interference falls within the dangerous range, Δ_d may be used as the update step. If the measured interference falls within the acceptable range, Δ_a may be used as the update step, and if the measured interference falls within the safe range, Δ_s may be used as the update step. The update step set of Δ_d/Δ_a/Δ_s may be defined based on a strategy for how the interference may be managed. For example, −1 dB/0 dB/1 dB for respective values of the set may reflect that a more stable interference management scheme is preferred, while −3 dB/1 dB/2 dB for the respective values of the set may indicate a more aggressive interference management scheme is being implemented. Further, based on various criteria, the values of the steps may be dynamically adjusted according to the current network status. In this regard, since PreExpInterfere value (e.g., ExpInterfere(PreExpInterfere)) may be an estimated value as described above, updating the associated ExpInterfere value, (e.g., ExpInterfere(ExpInterfere(i−1))) may be determined based on interference measurement results.

The updated ExpInterfere value may be compared to a MaxExpInterfere threshold value to ensure that the ExpInterfere value does not exceed the maximum allowed expected interference for the RB. In the event that the interference exceeds the MaxExpInterfere threshold value, the ExpInterfere value for the RB may be set to a forbidden value to thereby disallow further use of the RB for D2D communications. The MaxExpInterfere threshold value may be calculated using the following:

$$\text{MaxExpInterfere}=10*\log(\exp10(\text{UpLimInterfere}/10)-\exp10(\text{Noise}/10)). \quad (3)$$

While the example predefined ranges of FIG. 4 include three ranges, it is contemplated that any number of ranges may be defined by defining additional range transitions. Larger numbers of ranges may provide for a more elaborate interference control mechanism.

Allocated RBs, in contrast to free RBs, may be RBs that are currently allocated for cellular UL transmissions in certain TTI or time duration. The allocated RBs may bear traffic with varying Quality of Service (QoS) requirements and importance classes. The interference caused by D2D UEs on these RBs may be controlled more carefully, taking into account QoS and traffic priority.

Similar to scheme used for free RBs, the interference on an allocated RB can be divided into ranges (e.g., three ranges). A UpLimInterfere value and a SafeInterfere value may again be used as transition points between the ranges. However, for allocated RBs, the UpLimInterfere value and the SafeInterfere value may be determined based upon on UL RRM, UE characteristics, and the like. In this regard, for example, the UpLimInterfere value and the SafeInterfere value may be calculated as follows:

$$\text{UpLimInterfere}=(\text{MaxTxPower}-10\log(\text{NumOfAllocRb})-\text{Pathloss}-\text{SinrTarget}) \quad (4)$$

$$\text{SafeLimInterfere}=\min(\text{UpLimInterfere}-\text{ReservedMargin},\text{RecInterfere}+\text{AllowMargin}) \quad (5)$$

where all the values in the equations are Decibel (dB) values, except NumOfAllocRb. MaxTxPower may be the maximum transmission power of a cellular UE allocated the RB. According to some example embodiments, the MaxTxPower value may be obtained from the UE category exchanged during a random access procedure. NumOfAllocRb may be the number of allocated RBs for the same cellular UE. NumOfAllocRb may be obtained via UL RRM information. Pathloss may be the propagation loss between the cellular UE and the node. The cellular UE may report a Reference Signal Received Power (RSRP) measurement to node, if required. Based on the RSRP measurement, the node may calculate the path loss between the node and cellular UE. SinrTarget may be the Signal to Interference-plus-Noise Ratio (SINR) target of the RB. SinrTarget may be determined by the Modulation and Coding Scheme (MCS) selected by the node for the RB.

The ReservedMargin may be the interference margin reserved for the associated UE that has been allocated the RB, based on QoS requirements and traffic class. The ReservedMargin value may be used to resist the impact of fast fading, interference fluctuation, and the cumulative effects of the interference caused by multiple simultaneous D2D transmissions. The ReservedMargin may vary based upon the UE and the traffic to reflect changes in QoS requirements and service classes. RecInterfere may be the received interference power on the associated RB. According to some example embodiments, RecInterfere may be obtained by the node, since the received interference power of an RB is a required measurement in TS 36.214. The AllowMargin may be the allowed interference margin for the RB based on the received interference power and considering the capability of UL power control and Hybrid Automatic Repetition Request (HARQ).

Having defined the transition points for the ranges, the calculation of ExpInterfere values may be performed for the allocated RBs. The calculation of the ExpInterfere values may conducted in a similar fashion as described with the respect to the free RBs, where an initial ExpInterfere value may be determined by:

$$\text{ExpInterfere}=\text{PreExpInterfere}=10*\log(\exp10(\text{SafeInterfere}/10)-\exp10(\text{Noise}/10)). \quad (1)$$

and updates to the ExpInterfere value may be determined via:

$$\text{ExpInterfere}(i)=\text{ExpInterfere}(i-1)+\Delta. \quad (2)$$

Since dynamic RRM may be used in LTE systems, the time-variant resource allocation may require that ExpInterfere values be updated in each TTI, while also considering interference stability. Based on range division of the nodes received interference, the similar ExpInterfere update process given in equation (2) for free RBs can be also used for allocated RBs. However, the values of the update steps Δ_d/Δ_a/Δ_s may be different. For example, −3 dB/−1 dB/1 dB may be used to maintain the total interference near SafeInterfere. As described above with respect to the free RBs, any number of interference ranges may be defined and utilized to enable a more or less elaborate interference control system. Again, through adjustment of update steps, and other parameters mentioned above for ExpInterfere calculation and update, a network operator may flexibly control the D2D interference to trade off between cellular performance and D2D performance.

Also, for some special RBs carrying traffic with strict performance requirements, a special forbidden value ForbidExpInterfere may be set as ExpInterfere for the RBs. As a result, D2D UEs may be notified that these RBs are forbidden from selection for D2D transmission. Example RBs in this regard may include RBs for cellular UL signaling, such as the Physical Downlink Control Channel (PUCCH) and the Physical Random Access Channel (PRACH).

Figure 5:
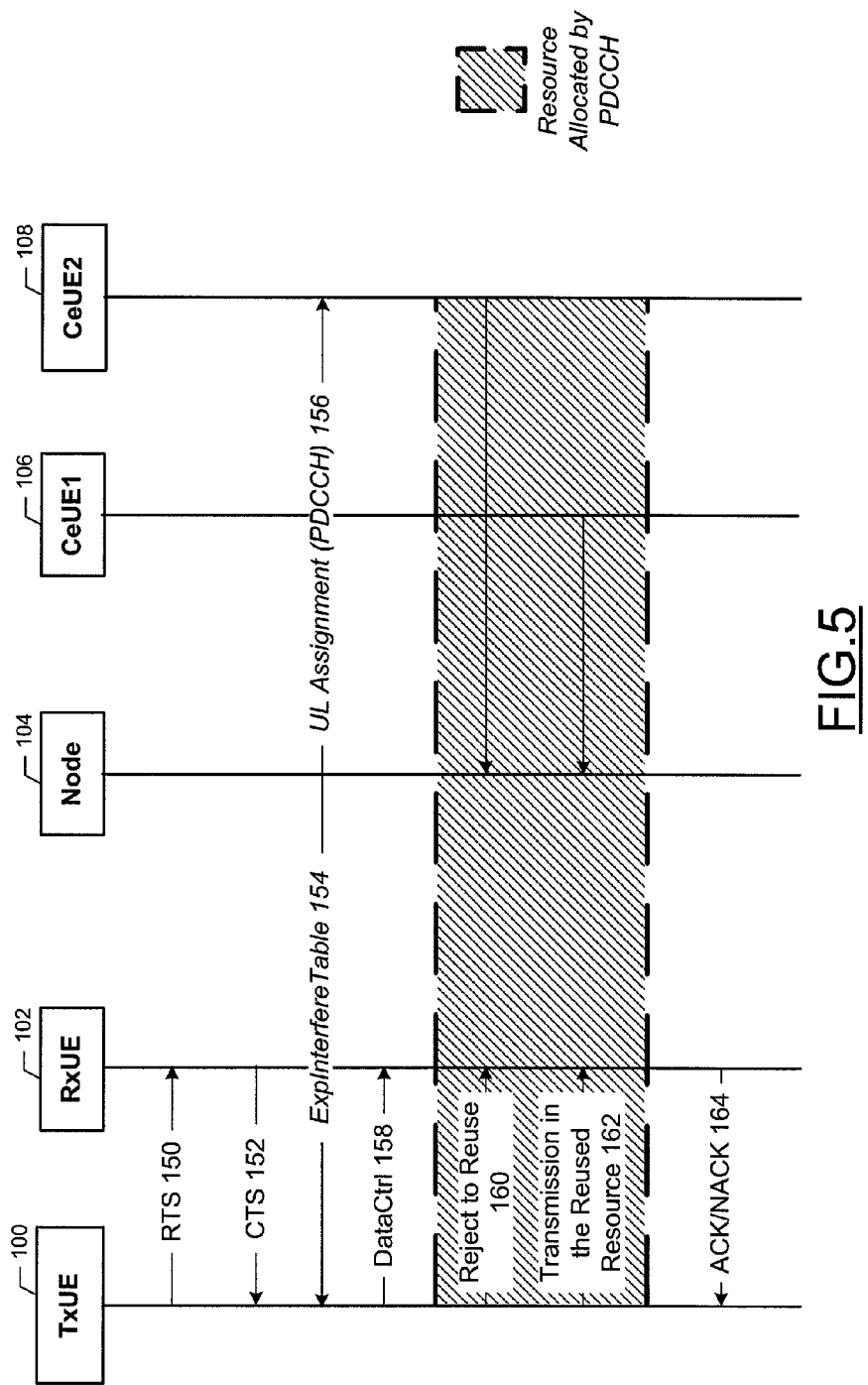
FIG. 5 illustrates an example signaling diagram for implementing D2D interference management according to various example embodiments of the present invention

FIG. 5 illustrates an example signaling flow scenario for D2D interference management involving UEs and a node in accordance with various example embodiments of the present invention. FIG. 5 illustrates the signaling flow using the node 104, and the UEs (TxUE 100, RxUE 102, CeUE1 106, and CeUE2 108) depicted in FIG. 1.

The signaling flow of FIG. 5 may begin with a handshake and competition procedure between TxUE 100 and RxUE 102 as part of an initial process for implementing D2D communications between TxUE 100 and RxUE 102. The handshake and competition procedure may include a Ready to Send (RTS) communication 150 and a Clear to Send (CTS)

communication 152. Via the handshake and competition procedure, D2D signaling and data transmissions may follow the same frame structure of cellular network. As such, the time relationship for communications may be well defined, and D2D UEs (e.g., TxUE 100 and RxUE 102) may be aware of which resource may be utilized through the handshake and competition procedure (RTS/CTS) at a specific time.

Node 104 may make RRM decisions for cellular UL transmissions and transmit the decisions in the UL Assignment (PDCCH) communication 156. The associated UL assignment information sent on PDCCH may include the resource allocation information and the selected MCS. In the example scenario of FIG. 5, the UL Assignment (PDCCH) communication 156 may be provided to CeUE2 108. According to various example embodiments, the cellular UL resource may be allocated to CeUE1 106 and CeUE2 108 in the resource allocated by UL assignment included in the PDCCH. As a result, the data transmission of CeUE1 106 and CeUE2 108 need not be time-division multiplexed, but rather frequency-division multiplexed because of the LTE characteristic.

Based on the cellular UL RRM, parameters set by a system operator, and/or available measurement results, node 104 may calculate and update an ExpInterfere value for each UL RB. An ExpInterfereTable composed of all the ExpInterfere values may be generated and broadcast by node 104 in communication 154. Communication 154 may be provided in the same TTI as the communication 156, when the related UL assignment information was sent. According to some example embodiments, the ExpInterfereTable may be sent with a predefined delay from the related PDCCH. The delay may be constant and known by the D2D UEs. For example, the constant delay could be included in the system information and broadcasted in the Physical Broadcast Channel (PBCH) to inform the D2D UEs of the delay.

The D2D UEs may decode the ExpInterfereTable, and analyze the ExpInterfere values for each the UL RBs. Based on the ExpInterfere values, D2D UEs may conduct D2D RRM decisions, such as resource allocation decisions for D2D transmissions, power decisions, and the like. In the example scenario of FIG. 5, the broadcast ExpInterfereTable is received and analyzed by TxUE 100. TxUE 100 desires to open a D2D communications session with RxUE 102. To do so, TxUE 100 transmits a DataCtrl communication 158 to RxUE 102. The DataCtrl communication 158 may include information for D2D data detection and decoding, such as resource information, data format, HARQ information, and the like. A defined time relationship may allow both TxUE 100 and RxUE 102 to identify which resource to use, with the associated DataCtrl information.

A D2D transmission may be provided according to the D2D RRM decisions made based on the ExpInterfere values. In the example scenario of FIG. 5, the resource allocated to CeUE1 106 may be chosen to be reused and transmission in the reused resource may occur at 162, while the resource allocated to CeUE2 108 may be avoided and/or rejected for use at 160. Further, the RxUE 102 may send an acknowledgement (ACK) or an unacknowledgement (NACK) 164 to TxUE 100 according to the received data.

In the example scenario described above, the example handshake and competition mechanism (e.g. RTS 150 and CTS 160) are included, but are not required for implementation of various example embodiments of the present invention. However, the handshake and competition mechanism may provide a guarantee that D2D RRM signaling may be completed successfully between a given set of devices. The handshake and competition mechanism may implement a resource competition procedure with RTS/CTS before the UL resource grant to thereby compete for the resource in future. After receiving the ExpInterfereTable, D2D UEs may then determine the transport format parameters, and send the parameters in DataCtrl 158. According to various example embodiments, additional signaling exchange between TxUE 100 and RxUE 102 may not be required. Accordingly, time requirements for implementing interference control may be satisfied.

Figure 6:
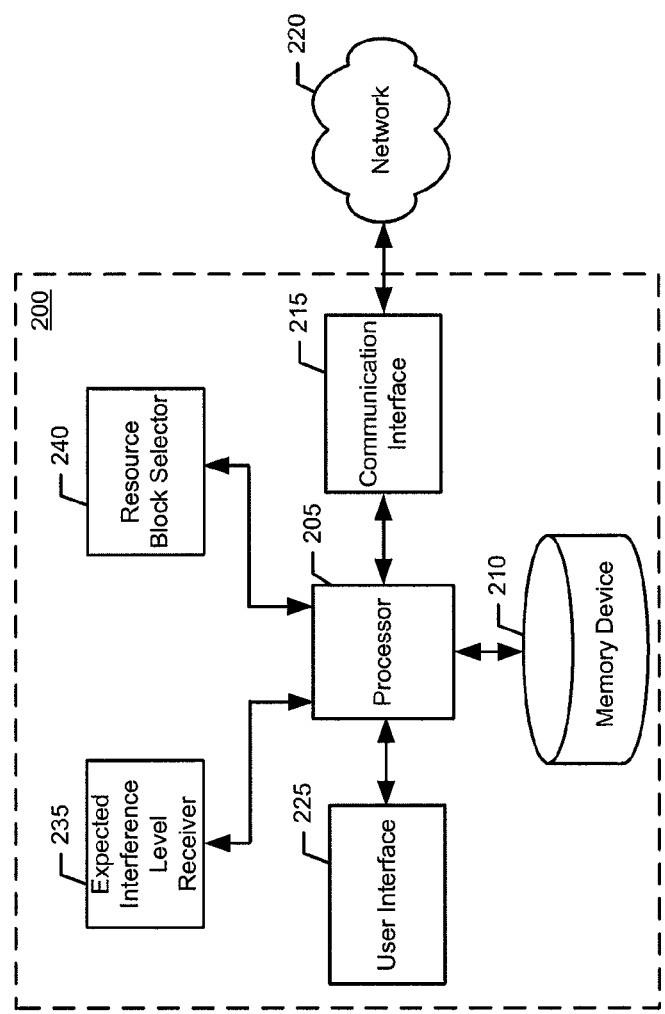
FIG. 6 illustrates a block diagram of an example resource block selection apparatus for managing D2D interference according to various example embodiments of the present invention.
Figure 7:
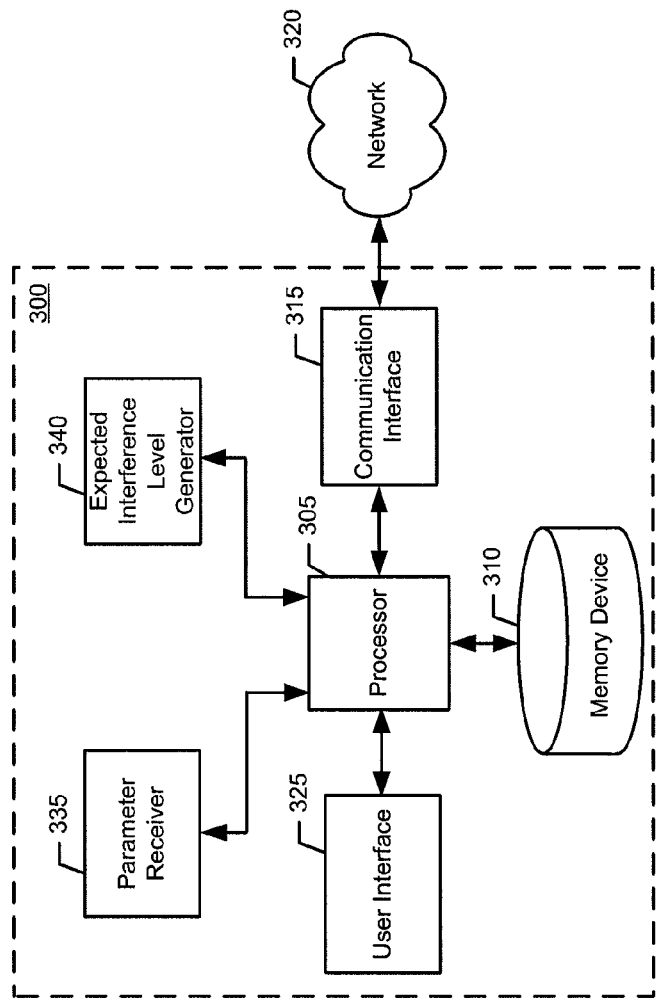
FIG. 7 illustrates a block diagram of an example expected interference level generation apparatus for managing D2D interference according to various example embodiments of the present invention.

The description provided above and generally herein illustrates example methods, example apparatuses, and example computer program products for managing D2D interference. FIGS. 6 and 7 illustrate example embodiments of the present invention in the form of an example apparatuses 200 and 300 that are configured to perform various aspects of the present invention as described herein. The apparatus 200 may be configured to perform the role of a resource block selection apparatus (e.g., TxUE 100), and the apparatus 300 may be configured to perform the role of an expected interference level generation apparatus (e.g., node 101). While the configuration of the expected interference level generation apparatus and the resource block selection apparatus are described with respect to separate example embodiments of the present invention, it is contemplated that one apparatus may be configured to perform the roles of both the expected interference level generation apparatus and the resource block selection apparatus. The example apparatuses 200 and 300 may also be configured to perform example methods of the present invention, such as those described with respect to FIGS. 8*a* and 8*b*.

Referring now to FIG. 6, in some example embodiments, the apparatus 200 is embodied as, or included as a component of, a communications device with wired or wireless communications capabilities. Some examples of the apparatus 200, or devices that may include the apparatus 200, include a communications network entity such as a UE or a node. In some example embodiments, the apparatus 200 may include or be included within a computer, a server, an access point, a base station, an eNodeB, a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. The example apparatus 200 includes or is otherwise in communication with a processor 205, a memory device 210, a communications interface 215, an expected interference level receiver 235, and a resource block selector 240. In some embodiments, the example apparatus 200 may optionally include a user interface 225. The processor 205 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors operating in concert. The processor 205 may, but need not, include one or more accompanying digital signal processors. In some example embodiments, the processor 205 is configured to execute instructions stored in the memory device 210 or instructions otherwise accessible to the processor 205. As such, whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The communication interface 215 may be any device or means embodied in either hardware, a computer program product, or a combination of hardware and a computer program product that is configured to receive and/or transmit data from/to a network and/or any other device or module in communication with the example apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including a processor for enabling communications with network 220. Via the communication interface 215 and the network 220, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 225 may be in communication with the processor 205 to receive user input via the user interface 225 and/or to present output to a user as, for example, audible, visual, mechanical or other output indications. The user interface 225 may include, for example, a keyboard, a mouse, a joystick, a display (e.g., a touch screen display), a microphone, a speaker, or other input/output mechanisms.

The expected interference level receiver 235 and/or the resource block selector 240 of example apparatus 200 may be any means or device embodied, partially or wholly, in hardware, a computer program product, or a combination of hardware and a computer program product, such as processor 205 implementing stored instructions to configure the example apparatus 200, or a hardware configured processor 205, that is configured to carry out the functions of the expected interference level receiver 235 and/or the resource block selector 240 as described herein. In an example embodiment, the processor 205 includes, or controls, the expected interference level receiver 235 and/or the resource block selector 240. The expected interference level receiver 235 and/or the resource block selector 240 may be, partially or wholly, embodied as processors similar to, but separate from processor 205. In this regard, the expected interference level receiver 235 and/or the resource block selector 240 may be in communication with the processor 205. In various example embodiments, the expected interference level receiver 235 and/or the resource block selector 240 may, partially or wholly, reside on differing apparatuses such that some or all of the functionality of the expected interference level receiver 235 and/or the resource block selector 240 may be performed by a first apparatus, and the remainder of the functionality of the expected interference level receiver 235 and/or the resource block selector 240 may be performed by one or more other apparatuses.

The expected interference level receiver 235 may be configured to receive an expected interference level for a resource block. In this regard, the expected interference level may be received via the network 220 and the communication interface 215 from, for example, a node. The expected interference level may be represented by data indicative of interference associated with the resource block due to device-to-device communications using the resource block. A determination of the expected interference level may be based at least in part on an interference measurement associated with the resource block.

In some example embodiments, the expected interference level receiver 235 may be configured to receive the expected interference level within a collection of interference levels for respective resources blocks within a plurality of resource blocks. For example, the expected interference level receiver 235 may be configured to receive the expected interference level within a table of data including expected interference levels for respective resource blocks. In some example embodiments, the expected interference level receiver 235 may be configured to receive the expected interference level, where the expected interference level has been updated for the resource block based upon a prior expected interference level and an update step value. In this regard, the update step value may be based at least in part upon the interference measurement associated with the resource block.

Further, in some example embodiments, the expected interference level receiver 235 may be configured to receive an expected interference level that has been determined based at least in part upon characteristics of a communications device (e.g., the apparatus 200) for device-to-device communications and quality of service parameters (e.g., importance class) for the resource block. The expected interference level receiver 235 may also receive an expected interference level that has been determined for a defined transmit time interval. In some example embodiments, the expected interference level receiver 235 may be configured to receive an expected interference level that has been defined for a frequency sub-band to facilitate frequency reuse.

The resource block selector 240 may be configured to select the resource block for a device-to-device communications session based at least in part on the expected interference level for the resource block. In some example embodiments, the resource block selector 240 may be configured to open a D2D communications session based on the selected resource block. The D2D session may be opened via the communication interface 215.

According to various example embodiments, the resource block selector 240 may be configured to select the resource block based at least in part on an expected interference level that has been determined to be less than a maximum interference (e.g., a threshold interference) for the resource block. Further, the resource block selector 240 may be configured to select the resource block based at least in part on an expected interference level that allows for the highest transmission power within a collection of expected interference levels.

Referring now to FIG. 7, in some example embodiments, the apparatus 300 is embodied as, or included as a component of, a communications device with wired or wireless communications capabilities. Some examples of the apparatus 300, or devices that may include the apparatus 300, include a communications network entity such as a UE or a node. In some example embodiments, the apparatus 300 may include or be included within a computer, a server, an access point, a base station, an eNodeB, a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like.

The example apparatus 300 includes or is otherwise in communication with a processor 305, a memory device 310, a communications interface 315, an parameter receiver 335, and an expected interference level generator 340. In some embodiments, the example apparatus 300 may optionally include a user interface 325. The processor 305 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 305 may be representative of a plurality of processors operating in concert. The processor 305 may, but need not, include one or more accompanying digital signal processors. In some example embodiments, the processor 305 is configured to execute instructions stored in the memory device 310 or instructions otherwise accessible to the processor 305. As such, whether configured as hardware or via instructions stored on a computer-readable storage medium, or by a combination thereof, the processor 305 may be an entity capable of performing operations according to embodiments of the present invention while configured accordingly. Thus, in example embodiments where the processor 305 is embodied as an ASIC, FPGA, or the like, the processor 305 is specifically configured hardware for conducting the operations described herein. Alternatively, in example embodiments where the processor 305 is embodied as an executor of instructions stored on a computer-readable storage medium, the instructions specifically configure the processor 305 to perform the algorithms and operations described herein. In some example embodiments, the processor 305 is a processor of a specific device (e.g., a mobile terminal) configured for employing example embodiments of the present invention by further configuration of the processor 305 via executed instructions for performing the algorithms and operations described herein.

The memory device 310 may be one or more computer-readable storage media that may include volatile and/or non-volatile memory. In some example embodiments, the memory device 310 includes Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310 may be configured to store information, data, applications, computer-readable program code instructions, or the like for enabling the processor 305 and the example apparatus 300 to carry out various functions in accordance with example embodiments of the present invention described herein. For example, the memory device 310 could be configured to buffer input data for processing by the processor 305. Additionally, or alternatively, the memory device 310 may be configured to store instructions for execution by the processor 305.

The communication interface 315 may be any device or means embodied in either hardware, a computer program product, or a combination of hardware and a computer program product that is configured to receive and/or transmit data from/to a network and/or any other device or module in communication with the example apparatus 300. Processor 305 may also be configured to facilitate communications via the communications interface by, for example, controlling hardware included within the communications interface 315. In this regard, the communication interface 315 may include, for example, one or more antennas, a transmitter, a receiver, a transceiver and/or supporting hardware, including a processor for enabling communications with network 320. Via the communication interface 315 and the network 320, the example apparatus 300 may communicate with various other network entities in a peer-to-peer fashion or via indirect communications via a base station, access point, server, gateway, router, or the like.

The communications interface 315 may be configured to provide for communications in accordance with any wired or wireless communication standard. The communications interface 315 may be configured to support communications in multiple antenna environments, such as multiple input multiple output (MIMO) environments. Further, the communications interface 315 may be configured to support orthogonal frequency division multiplexed (OFDM) signaling. In some example embodiments, the communications interface 315 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 315 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 315 may also be configured to support communications at the network layer, possibly via Internet Protocol (IP).

The user interface 325 may be in communication with the processor 305 to receive user input via the user interface 325 and/or to present output to a user as, for example, audible, visual, mechanical or other output indications. The user interface 325 may include, for example, a keyboard, a mouse, a joystick, a display (e.g., a touch screen display), a microphone, a speaker, or other input/output mechanisms.

The parameter receiver 335 and the expected interference level 340 of example apparatus 300 may be configured to cause the apparatus 300 to perform various functionalities. The parameter receiver 335 and/or the expected interference level 340 of example apparatus 300 may be any means or device embodied, partially or wholly, in hardware, a computer program product, or a combination of hardware and a computer program product, such as processor 305 implementing stored instructions to configure the example apparatus 300, or a hardware configured processor 305, that is configured to carry out the functions of the parameter receiver 335 and/or the expected interference level 340 as described herein. In an example embodiment, the processor 305 includes, or controls, the parameter receiver 335 and/or the expected interference level 340. The parameter receiver 335 and/or the expected interference level 340 may be, partially or wholly, embodied as processors similar to, but separate from processor 305. In this regard, the parameter receiver 335 and/or the expected interference level 340 may be in communication with the processor 305. In various example embodiments, the parameter receiver 335 and/or the expected interference level 340 may, partially or wholly, reside on differing apparatuses such that some or all of the functionality of the parameter receiver 335 and/or the expected interference level 340 may be performed by a first apparatus, and the remainder of the functionality of the parameter receiver 335 and/or the expected interference level 340 may be performed by one or more other apparatuses.

The parameter receiver 335 may be configured to receive parameters for generating an expected interference level, such as, an interference measurement associated with a resource block. The expected interference level generator 340 may be configured to determine an expected interference level for the resource block based at least in part on the parameters including the interference measurement. In some example embodiments, the expected interference level generator 340 may be configured to set the expected interference level to a predefined forbidden value in response to the expected interference level exceeding a maximum interference for the resource block.

The expected interference level generator 340 may also be configured to provide for transmission of data indicative of the expected interference level in association with the resource block. The data may be provided to one or more communications devices (e.g., UEs) to facilitate the selection of the resource block for device-to-device communications based at least in part on the expected interference level. In some example embodiments, the expected interference level generator 340 may be configured to provide for transmission of data indicative of the expected reference level within a collection of expected interference levels having respective resource blocks.

In some example embodiments, the expected interference level generator 340 may be further configured to update the expected interference level for the resource block based upon a prior expected interference level and an update step value. In this regard, the update step value may be based at least in part upon the interference measurement associated with the resource block.

FIGS. 8*a* and 8*b* illustrate flowcharts of example systems, methods, and/or computer program products according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as memory devices 210 or 310, of an example apparatus, such as example apparatus 200 or 300, and executed by a processor, such as the processor 205 or 305. As will be appreciated, any such program code instructions may be loaded onto a computer or other programmable apparatus (e.g., processor 205 or 305, memory device 210 or 310) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

FIG. 8a depicts an example method for managing D2D interference from the perspective of a resource block selection apparatus (e.g., TxUE 100) according to various embodiments of the present invention. FIG. 8b depicts an example method for managing D2D interference from the perspective of a expected interference level generation apparatus (e.g., node 101) according to various embodiments of the present invention. While the example methods of FIGS. 8a and 8b are described as being separate example embodiments, it is contemplated that some or all of the operations of example methods may be combined.

Referring to FIG. 8a, the example method may include receiving an expected interference level for a resource block at 400. In this regard, the expected interference level may be received from, for example, a node, such as node 101. The expected interference level may be represented by data indicative of interference associated with the resource block due to device-to-device communications using the resource block. A determination of the expected interference level may be based at least in part on an interference measurement associated with the resource block.

In some example embodiments, receiving the expected interference level may include receiving the expected interference level within a collection of interference levels for respective resources blocks within a plurality of resource blocks. For example, the expected interference level may be received within a table of data including expected interference levels for respective resource blocks. In some example embodiments, receiving an expected interference level may include receiving an expected interference level that has been updated for the resource block based upon a prior expected interference level and an update step value. In this regard, the update step value may be based at least in part upon the interference measurement associated with the resource block.

Further, in some example embodiments, receiving an expected interference level may include receiving an expected interference level that has been determined based at least in part upon characteristics of a communications device (e.g., the apparatus 200) for device-to-device communications and quality of service parameters (e.g., importance class) for the resource block. Receiving an expected interference level may also include receiving an expected interference level that has been determined for a defined transmit time interval. Further, in some example embodiments, receiving an expected interference level may include receiving an expected interference level that has been defined for a frequency sub-band to facilitate frequency reuse.

The example method of FIG. 8a may also include selecting the resource block for a device-to-device communications session based at least in part on the expected interference level for the resource block at 405. In some example embodiments, selecting the resource block may include opening a D2D communications session based on the selected resource block.

According to various example embodiments, selecting the resource block may also include selecting the resource block based at least in part on an expected interference level, that has been determined to be less than a maximum interference (e.g., a threshold interference) for the resource block. Further, selecting the resource block may include selecting the resource block based at least in part on an expected interference level that allows for the highest transmission power within a collection of expected interference levels.

Referring to FIG. 8a, the example method may include receiving parameters for generating an expected interference level, such as an interference measurement associated with a resource block at 410, and determining an expected interference level for the resource block based at least in part on the interference measurement at 415. In some example embodiments, determining an expected interference level may include setting the expected interference level to a predefined forbidden value in response to the expected interference level exceeding a maximum interference for the resource block.

The example method of FIG. 8b may also include providing for transmission of data indicative of the expected interference level in association with the resource block at 420. The data may be provided to one or more communications devices (e.g., UEs) to facilitate the selection of the resource block for device-to-device communications based at least in part on the expected interference level. In some example embodiments, providing for transmission of data may include providing for transmission of data indicative of the expected reference level within a collection of expected interference levels having respective resource blocks.

In some example embodiments, the example method of FIG. 8b may also include updating the expected interference level for the resource block based upon a prior expected interference level and an update step value. In this regard, the update step value may be based at least in part upon the interference measurement associated with the resource block.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving an expected interference level for a resource block broadcasted from a network node, the expected interference level being indicative of interference associated with the resource block due to device-to-device communications using the resource block; and
selecting the resource block for a device-to-device communications session based at least in part on the expected interference level for the resource block.

2. The method of claim 1, wherein receiving the expected interference level includes receiving the expected interference level into a table of interference levels and respective resources blocks.

3. The method of claim 1, wherein receiving the expected interference level includes receiving one or more expected interference levels for one or more respective resource blocks; and wherein selecting the resource block includes selecting one or more resource blocks for the device-to-device communications session based at least in part on the one or more expected interference levels.

4. The method of claim 1, wherein the expected interference level having been updated for the resource block based upon a prior expected interference level and an update step value, the update step value being based at least in part upon the interference measurement associated with the resource block.

5. The method of claim 1, wherein selecting the resource block includes selecting the resource block based at least in part on the expected interference level, the expected interference level having been determined to be less than a maximum interference for the resource block.

6. An apparatus, comprising:
at least one processor; and
at least one memory including computer program code
the at least one memory and computer program code configured to, with the at least one processor, cause the apparatus to perform at least the following:
receive an expected interference level for a resource block broadcasted from a network node, the expected interference level being indicative of interference associated with the resource block due to device-to-device communications using the resource block; and
select the resource block for a device-to-device communications session based at least in part on the expected interference level for the resource block.

7. The apparatus of claim 6, wherein the memory and computer program code are configured to, with the at least one processor, cause the apparatus to receive the expected interference level into a table of interference levels and respective resources blocks.

8. The apparatus of claim 6, wherein the memory and computer program code are configured to, with the at least one processor, cause the apparatus to receive one or more expected interference levels for one or more respective resource blocks; and to select one or more resource blocks for the device-to-device communications session based at least in part on the one or more expected interference levels.

9. The apparatus of claim 6, wherein the memory and computer program code are configured to, with the at least one processor, cause the apparatus to receive the expected interference level, the expected interference level having been updated for the resource block based upon a prior expected interference level and an update step value, the update step value being based at least in part upon the interference measurement associated with the resource block.

10. The apparatus of claim 6, wherein the memory and computer program code are configured to, with the at least one processor, cause the apparatus to select the resource block based at least in part on the expected interference level, the expected interference level allowing for a highest transmission power within a collection of expected interference levels.

11. The apparatus of claim 6, wherein the expected interference level having been defined for a frequency sub-band to facilitate frequency reuse.

12. A non-transitory computer program product comprising at least one computer-readable storage medium having executable computer-readable program instructions stored therein, the computer-readable program instructions comprising:
a program instruction for receiving an expected interference level for a resource block broadcasted from a network node, the expected interference level being represented by data indicative of interference associated with the resource block due to device-to-device communications using the resource block; and
a program instruction for selecting the resource block for a device-to-device communications session based at least in part on the expected interference level for the resource block.

13. A method comprising:
receiving an interference measurement associated with a resource block;
determining an expected interference level for the resource block based at least in part on the interference measurement; and
providing for broadcasting of data indicative of the expected interference level in association with the resource block to one or more communications devices to facilitate a selection of the resource block for device-to-device communications based at least in part on the expected interference level.

14. The method of claim 13, wherein providing for broadcasting of data indicative of the expected reference level, includes providing for transmission of data indicative of the expected reference level within a collection of expected interference levels having respective resource blocks.

15. The method of claim 13, further comprising updating the expected interference level for the resource block based at least in part upon a prior expected interference level and an update step value, the update step value being based at least in part upon the interference measurement associated with the resource block.

16. The method of claim 13, wherein determining the expected interference level includes setting the expected interference level to a forbidden value in response to the expected interference level exceeding a maximum interference for the resource block.

17. An apparatus, comprising:
   at least one a processor; and
   at least one memory including computer program code the at lease one memory and computer program code configured to with the at least one processor, cause the apparatus to perform at least the following:
   receive an interference measurement associated with a resource block;
   determine an expected interference level for the resource block based at least in part on the interference measurement; and
   broadcast data indicative of the expected interference level in association with the resource block to one or more communications devices to facilitate a selection of the resource block for device-to-device communications based at least in part on the expected interference level.

18. The apparatus of claim 17, wherein the memory and computer program code are configured to, with the at least one processor, further cause the apparatus to update the expected interference level for the resource block based upon a prior expected interference level and an update step value, the update step value being based at least in part upon the interference measurement associated with the resource block.

19. The apparatus of claim 17, wherein the memory and computer program code are configured to, with the at least one processor, cause the apparatus to set the expected interference level to a forbidden value in response to the expected interference level exceeding a maximum interference for the resource block.

20. A non-transitory computer program product comprising at least one computer-readable storage medium having executable computer-readable program instructions stored therein, the computer-readable program instructions comprising:
   a program instruction for receiving an interference measurement associated with a resource block;
   a program instruction for determining an expected interference level for the resource block based at least in part on the interference measurement; and
   a program instruction for broadcasting data indicative of the expected interference level in association with the resource block to one or more communications devices to facilitate a selection of the resource block for device-to-device communications based at least in part on the expected interference level.

* * * * *